US012811153B2

(12) United States Patent
Deguchi et al.

(10) Patent No.: US 12,811,153 B2
(45) Date of Patent: Nov. 24, 2026

(54) LITHIUM-ION RECHARGEABLE BATTERY

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Shotaro Deguchi, Toyohashi (JP); Hiroaki Ikeda, Toyota (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC, Tokyo (JP)

( * ) Notice: Subject to any disclaimer, the term of this patent is extended or adjusted under 35 U.S.C. 154(b) by 879 days.

(21) Appl. No.: 18/086,084

(22) Filed: Dec. 21, 2022

(65) Prior Publication Data

US 2023/0282834 A1 Sep. 7, 2023

(30) Foreign Application Priority Data

Dec. 23, 2021 (JP) ................................ 2021-209927

(51) Int. Cl.

| | |
|---|---|
| ***H01M 4/62*** | (2006.01) |
| ***H01M 4/04*** | (2006.01) |
| ***H01M 10/0525*** | (2010.01) |
| ***H01M 10/0567*** | (2010.01) |
| *H01M 4/02* | (2006.01) |

(52) U.S. Cl.

CPC ......... *H01M 4/624* (2013.01); *H01M 4/0404* (2013.01); *H01M 10/0525* (2013.01); *H01M 10/0567* (2013.01); *H01M 2004/028* (2013.01)

(58) Field of Classification Search

CPC ............ H01M 10/0567; H01M 4/624; H01M 4/0404; H01M 10/0525

See application file for complete search history.

(56) References Cited

U.S. PATENT DOCUMENTS

2006/0099515 A1* 5/2006 Yamaguchi ....... H01M 10/4235 429/219
2020/0287234 A1 9/2020 Umetsu et al.
(Continued)

FOREIGN PATENT DOCUMENTS

JP 2016-186915 A 10/2016
JP 2019-079710 A 5/2019
(Continued)

OTHER PUBLICATIONS

ChemicalBook. (2017). 9003-07-0(Polypropylene) Product Description. https://www.chemicalbook.com/ChemicalProductProperty_US_CB8366058.aspx (Year: 2017).*
(Continued)

*Primary Examiner* — Mark Ruthkosky
(74) *Attorney, Agent, or Firm* — Maschoff Brennan

(57) ABSTRACT

A lithium-ion rechargeable battery includes a positive electrode mixture that includes a positive electrode active material and a lithium salt. The lithium salt reacts with hydrogen fluoride generated in an electrolytic solution to produce an organic acid that is a weak acid relative to the hydrogen fluoride, an acid dissociation constant of the organic acid being 3.15 or higher.

8 Claims, 3 Drawing Sheets

(56) References Cited

U.S. PATENT DOCUMENTS

| | | | | |
|---|---|---|---|---|
| 2021/0151798 | A1* | 5/2021 | Schmidt ............ | H01M 10/0567 |
| 2021/0265623 | A1* | 8/2021 | Tsujimura ............. | H01M 4/628 |
| 2024/0162499 | A1* | 5/2024 | Tanimoto .............. | H01M 4/364 |

FOREIGN PATENT DOCUMENTS

| | | | |
|---|---|---|---|
| JP | 2019-164960 | A | 9/2019 |
| JP | 2021-163626 | A | 10/2021 |

OTHER PUBLICATIONS

National Center for Biotechnology Information (2025). PubChem Compound Summary for CID 176, Acetic Acid. Retrieved Nov. 13, 2025 from https://pubchem.ncbi.nlm.nih.gov/compound/Acetic-Acid. (Year: 2025).*

Japanese Office Action dated Jan. 9, 2024 as received in application No. 2021-209927.

CN Office Action dated Jan. 20, 2026 in application No. 202211631279.4.

* cited by examiner

LITHIUM-ION RECHARGEABLE BATTERY

BACKGROUND

1. Field

The present disclosure relates to a lithium-ion rechargeable battery and a method for manufacturing a lithium-ion rechargeable battery.

2. Description of Related Art

A lithium-ion rechargeable battery generally has a configuration in which a mixture paste containing a positive electrode active material is applied to a base, which serves as a current collector, to form a positive electrode mixture layer on the base, that is, to form a positive electrode on the base. For example, Japanese Laid-Open Patent Publication No. 2019-164960 discloses a configuration in which ingredients of a mixture paste are adjusted to suppress an increase in viscosity due to changes over time and to ensure high output characteristics at low temperatures.

A fluorine-containing non-aqueous electrolytic solution is usually used in a lithium-ion rechargeable battery. Accordingly, hydrogen fluoride, that is, hydrofluoric acid, may be generated in the electrolytic solution due to a change in electric potential caused by charging/discharging, incorporation of moisture, or the like. Such hydrogen fluoride attacks and denatures the active material in the positive electrode mixture, so that battery performance may deteriorate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A lithium-ion rechargeable battery according to one aspect of the present disclosure includes a positive electrode mixture that includes a positive electrode active material and a lithium salt. The lithium salt reacts with hydrogen fluoride generated in an electrolytic solution to produce an organic acid that is a weak acid relative to the hydrogen fluoride, an acid dissociation constant of the organic acid being 3.15 or higher.

With the above-described configuration, the hydrogen fluoride generated in the electrolytic solution is consumed by a weak acidic dissociation reaction of the lithium salt contained in the positive electrode mixture. This suppresses denaturation of the positive electrode active material due to attack by hydrogen fluoride, ensuring excellent battery performance.

In particular, the use of lithium salt does not inhibit the battery reaction. Thus, this configuration ensures superior battery performance.

When the lithium-ion rechargeable battery is in an overheated state, for example, when a short circuit occurs between the positive electrode and the negative electrode, the organic acid, which is a product of the weak acidic dissociation reaction, is vaporized to form bubbles, and the bubbles envelop the positive electrode active material. This inhibits the charge transfer to the positive electrode active material, thereby increasing the electrical resistance. The current is thus interrupted, so that a further temperature increase is prevented. As a result, a high level of safety is ensured.

In the above-described lithium-ion rechargeable battery, a concentration of the lithium salt included in the positive electrode mixture may be in a range of 10 ppm to 5000 ppm.

The above-described configuration improves battery performance effectively without inhibiting the battery reaction.

In the above-described lithium-ion rechargeable battery, the electrolytic solution may include a fluorine compound as an additive.

By using the fluorine-containing additive, battery performance is improved. However, hydrogen fluoride is easily generated in the electrolytic solution. This configuration achieves a more remarkable advantage.

In the above-described lithium-ion rechargeable battery, a number of fluorine atoms included in one molecule of the fluorine compound additive may be one. The fluorine compound additive may be added to the electrolytic solution in a range of 0.01 mol/L to 0.3 mol/L. A concentration of the lithium salt included in the positive electrode mixture may be in a range of 80 ppm to 3000 ppm.

This configuration improves battery performance effectively in a case in which the electrolytic solution contains a fluorine-containing additive.

In the above-described lithium-ion rechargeable battery, the concentration of the lithium salt may be greater than or equal to 100 ppm.

This configuration improves battery performance effectively.

In the above-described lithium-ion rechargeable battery, a concentration of the lithium salt included in the positive electrode mixture may be in a range of 500 ppm to 3000 ppm.

This configuration improves battery performance effectively.

In the above-described lithium-ion rechargeable battery, a boiling point of the organic acid maybe lower than or equal to a melting point of a separator.

When the separator is in an overheated state, this configuration interrupts current to prevent a further temperature increase before the separator melts and the positive electrode and the negative electrode come into surface contact with each other. This ensures a higher level of safety.

In the above-described lithium-ion rechargeable battery, the organic acid may include acetic acid.

Since the acid dissociation constant of the acetic acid is 3.15 or higher, the weak acidic dissociation reaction with hydrogen fluoride generated in the electrolytic solution rapidly proceeds. This effectively suppresses denaturation of the positive electrode active material due to attack by hydrogen fluoride, ensuring excellent battery performance.

In addition, since the boiling point of acetic acid is relatively low, acetic acid is easily vaporized when in an overheated state. Further, the vaporized acetic acid forms bubbles and envelops the positive electrode active material, so that the electric resistance increases and the current is interrupted. This prevents a further temperature increase. As a result, a high level of safety is ensured.

A method of manufacturing a lithium-ion rechargeable battery according to another aspect of the present disclosure includes: causing a mixture paste to contain a lithium salt, wherein the lithium salt reacts with hydrogen fluoride generated in an electrolytic solution to produce an organic acid that is a weak acid relative to the hydrogen fluoride, an acid dissociation constant of the organic acid being 3.15 or higher; and applying the mixture paste including a positive electrode active material to a base serving as a current collector, thereby forming a positive electrode mixture layer on the base.

With the above-described configuration, the hydrogen fluoride generated in the electrolytic solution is consumed by a weak acidic dissociation reaction of the lithium salt contained in the positive electrode mixture. This suppresses denaturation of the positive electrode active material due to attack by hydrogen fluoride, ensuring excellent battery performance.

The above-described method of manufacturing the lithium-ion rechargeable battery may include, when producing the mixture paste, producing the lithium salt by adding the organic acid to the mixture paste and causing the organic acid to react with excess lithium in the positive electrode active material.

The above-described configuration uses the neutralization reaction between the excess lithium in the positive electrode active material and the organic acid added to the mixture paste, thereby facilitating the manufacture of the lithium-ion rechargeable battery in which the positive electrode mixture contains lithium salt that reacts with hydrogen fluoride generated in the electrolytic solution.

In addition, the lithium salt in the positive electrode mixture is substantially uniformly present as fine particles around the positive electrode active material. Thus, the lithium salt can be efficiently reacted with hydrogen fluoride that attacks the positive electrode active material.

Further, the organic acid, which is the product of the weak acidic dissociation reaction, is present in the vicinity of the positive electrode active material. Accordingly, the vaporized organic acid rapidly envelops the positive electrode active material when overheated. This suppresses a further temperature increase in a more favorable manner.

In addition, the fine particulate lithium salt present around the positive electrode active material improves the sliding property within the positive electrode active material contained in the positive electrode mixture. Thus, when the electrode body is formed, the pressure acting on the positive electrode active material is reduced.

In the above-described method of manufacturing the lithium-ion rechargeable battery, the producing the lithium salt is performed, in a state in which the excess lithium is present in the positive electrode active material in a concentration range of 0.03 wt % to 0.5 wt % with respect to the positive electrode active material, by adding, to the mixture paste, the organic acid in a range of 0.1 to 3 equivalents with respect to the positive electrode active material.

The above-described configuration produces a lithium salt having a favorable concentration in the positive electrode mixture.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A lithium-ion rechargeable battery 1 and a method for manufacturing the same according to one embodiment will now be described with reference to the drawings.

Figure 1:
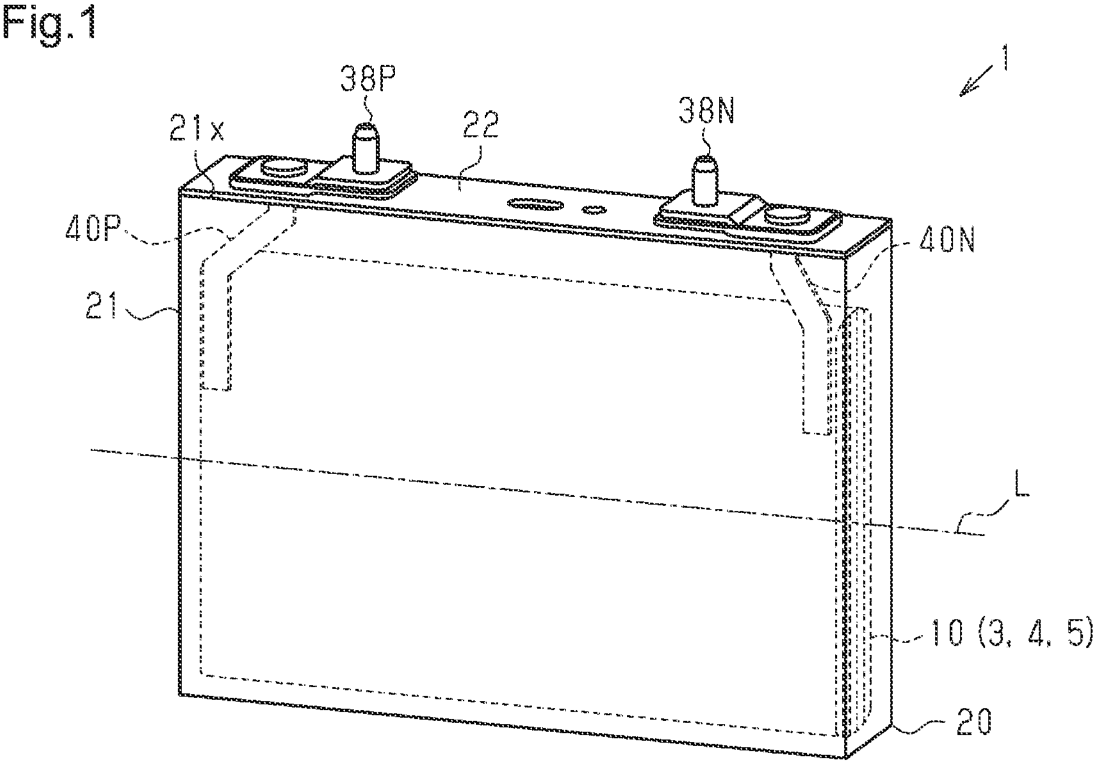
FIG. 1 is a perspective view of a lithium-ion rechargeable battery.

As shown in FIG. 1, the lithium-ion rechargeable battery 1 includes an electrode body 10 and a case 20, which accommodates the electrode body 10. The electrode body 10 is formed by integrating a positive electrode 3, a negative electrode 4, and separators 5. In the lithium-ion rechargeable battery 1 of the present embodiment, the electrode body 10 in the case 20 is impregnated with a non-aqueous electrolytic solution (not shown).

Specifically, the positive electrode 3, the negative electrode 4, and the separators 5 in the lithium-ion rechargeable battery 1 of the present embodiment have outer shapes of sheets and are stacked together. The stacked body of the positive electrode 3, the negative electrode 4, and the separators 5 is rolled to form the electrode body 10, with one of the separators 5 sandwiched between the positive electrode 3 and the negative electrode 4. In the electrode body 10, the electrodes 3, 4 and the separators 5 are arranged alternately in the radial direction. For example, the positive electrode 3, one of the separators 5, the negative electrode 4, and the other separator 5 are arranged in that order.

The case 20 of the present embodiment includes a case body 21, which has the shape of a flattened rectangular box, and a lid member 22, which closes an open end 21*x* of the case body 21. The electrode body 10 of the present embodiment has a flattened outer shape in correspondence with the box-shape of the case 20.

Figure 2:
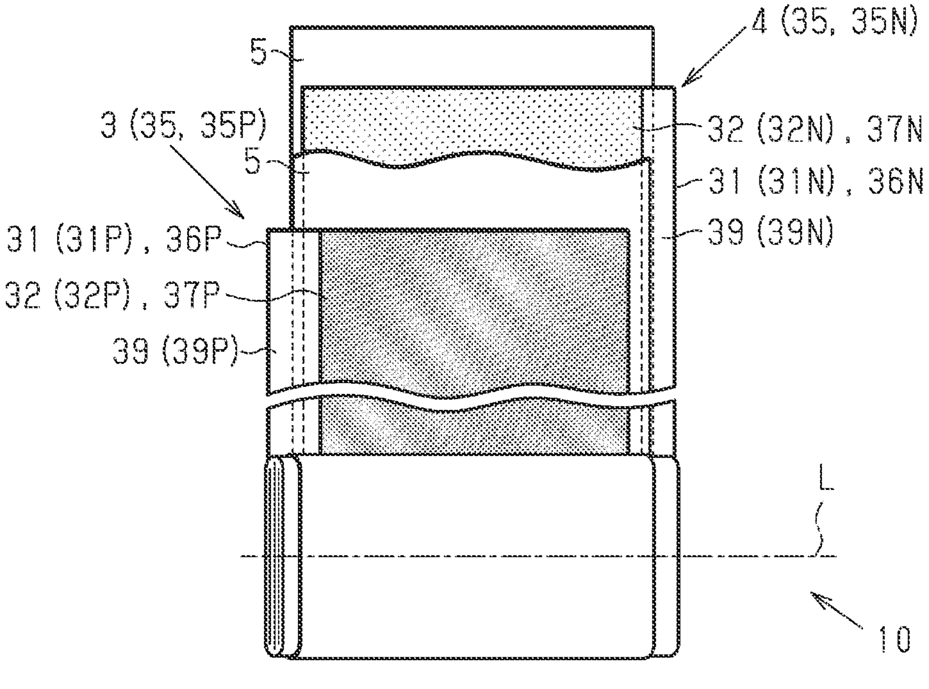
FIG. 2 is an exploded view of an electrode body.

Specifically, the positive electrode 3 and the negative electrode 4 in the lithium-ion rechargeable battery 1 of the present embodiment each have an electrode sheet 35 as shown in FIG. 2. The electrode sheets 35 each include a sheet-shaped current collector 31 and an electrode active material layer 32 stacked on the current collector 31.

Specifically, a positive electrode sheet 35P for the positive electrode 3 includes a base 36P and a mixture paste 37P. The base 36P is made of aluminum or the like, which forms a positive electrode collector 31P. The mixture paste 37P contains lithium transition metal oxide serving as a positive electrode active material and is applied to the base 36P. An electrode sheet 35N for the negative electrode 4 includes a base 36N and a mixture paste 37N. The base 36N is made of copper or the like, which forms a negative electrode collector 31N. The mixture paste 37N contains a carbon-containing material serving as a negative electrode active material and is applied to the base 36N. Each of the mixture pastes 37P, 37N contains a binding agent. In the lithium-ion rechargeable battery 1 of the present embodiment, the positive the electrode active material layer 32P and the negative the electrode active material layer 32N corresponding to the positive electrode sheet 35P and the negative electrode sheet 35N are formed by drying the mixture pastes 37P, 37N.

The positive and negative electrode sheets 35P, 35N are each formed to have the shape of a band in the lithium-ion rechargeable battery 1 of the present embodiment. In the electrode body 10 of the present embodiment, the positive and negative electrode sheets 35P, 35N, which are stacked together with one of the separators 5 between them, are rolled about a rolling axis L extending in a width direction of the band shape (lateral direction as viewed in FIG. 2).

In FIG. 2, the separators 5 and the electrode sheets 35 are rolled with the electrode sheet 35P, which forms the positive electrode 3, being wrapped inside. FIG. 2 merely illustrates an example of the configuration of the electrode body 10. For example, the separators 5 and the electrode sheets 35 may be rolled with the electrode sheet 35N, which forms the negative electrode 4, being wrapped inside. This determines whether the electrode sheet 35 that is arranged at the outermost layer of the electrode body 10 is the electrode sheet 35P, which forms the positive electrode 3, or the electrode sheet 35N, which forms the negative electrode 4.

Figure 3:
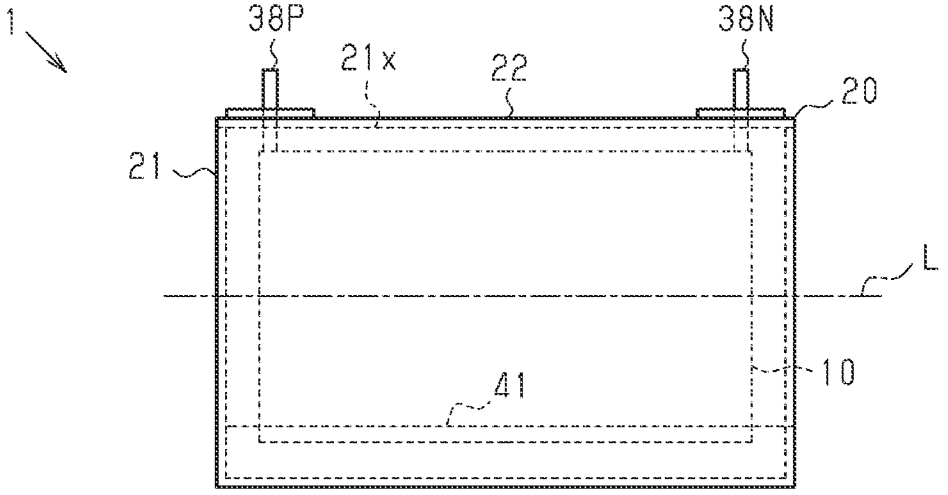
FIG. 3 is a side view of the lithium-ion rechargeable battery.

As shown in FIGS. 1 to 3, the case 20 includes a positive terminal 38P and a negative terminal 38N, which protrude outward from the lid member 22 of the case 20. Further, each electrode sheet 35 includes an uncoated portion 39 on the current collector 31, on which the electrode active material layer 32 is not formed. In the lithium-ion rechargeable battery 1 of the present embodiment, the uncoated portions 39 are used to electrically connect the electrode sheet 35P, which forms the positive electrode 3, to the positive terminal 38P, and to electrically connect the electrode sheet 35N, which forms the negative electrode 4, to the negative terminal 38N.

Specifically, the electrode body 10 of the present embodiment is accommodated in the case 20 such that the rolling axis L extends along the longitudinal direction (lateral direction as viewed in FIG. 1) of the lid member 22, which has the shape of an elongated rectangular plate. In this state, the uncoated portion 39P of the electrode sheet 35P, which forms the positive electrode 3, is connected to the positive terminal 38P by a connecting member 40P. Likewise, the uncoated portion 39N of the electrode sheet 35N, which forms the negative electrode 4, is connected to the negative terminal 38N by a connecting member 40N.

Further, an electrolytic solution 41 is injected into the case 20. The electrolytic solution 41 used in the lithium-ion rechargeable battery 1 of the present embodiment is a fluorine-containing electrolytic solution prepared by dissolving lithium salt, which serves as supporting salt, in organic solvent. In the lithium-ion rechargeable battery 1 of the present embodiment, the electrode body 10, which is encapsulated in the case 20, is impregnated with the electrolytic solution 41.

Function of Consuming Hydrogen Fluoride Generated in Electrolytic Solution

A function of consuming hydrogen fluoride generated in the electrolytic solution in the lithium-ion rechargeable battery 1 of the present embodiment will now be described.

Figure 4:
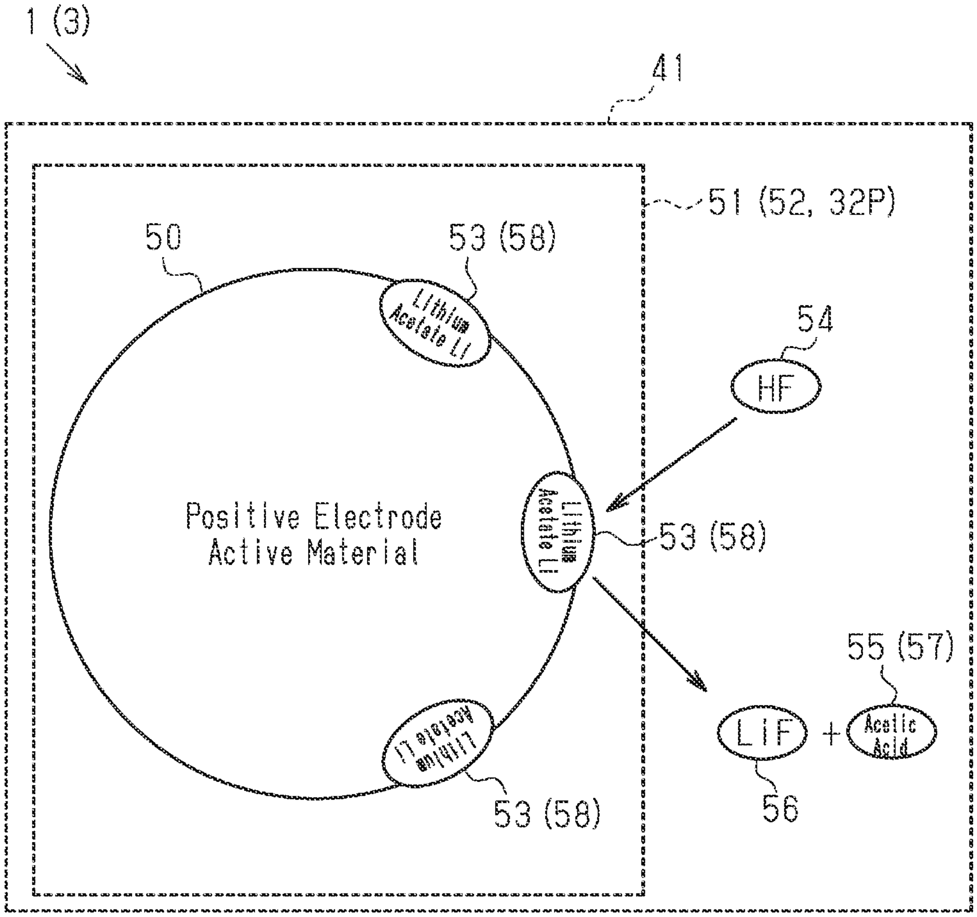
FIG. 4 is an explanatory diagram schematically showing a reaction between lithium acetate contained in a positive electrode mixture layer and hydrogen fluoride generated in an electrolytic solution.

In the lithium-ion rechargeable battery 1 of the present embodiment, the positive electrode 3 is formed by a positive electrode mixture 51, which includes a positive electrode active material 50, as shown in FIG. 4. The positive electrode mixture 51 includes a positive electrode mixture layer 52 that is formed by applying the mixture paste 37P containing the positive electrode active material 50 on the base 36P as described above (refer to FIG. 2). The positive electrode mixture layer 52 functions as the positive electrode active material layer 32P. In the lithium-ion rechargeable battery 1 of the present embodiment, the positive electrode mixture 51 contains lithium acetate 53 in addition to the positive electrode active material 50 and a binding agent (not shown). Further, in the lithium-ion rechargeable battery 1 of the present embodiment, the lithium acetate 53 reacts with hydrogen fluoride 54 generated in the electrolytic solution 41, that is, with hydrofluoric acid. Accordingly, the lithium-ion rechargeable battery 1 of the present embodiment has a function of consuming the hydrogen fluoride 54, which is generated in the electrolytic solution 41 due to a change in the electric potential caused by charge and discharge, mixing of moisture, or the like.

Specifically, the process in which the hydrogen fluoride 54 is generated in the electrolytic solution 41 can be represented by, for example, the following reaction formulas.

$$LiPF_6 \longrightarrow LiF + PF_5 \quad (1)$$

$$PF_5 + H_2O \longrightarrow POF_3 + 2HF \quad (2)$$

$$POF_3 + H_2O \longrightarrow PO_2F + 2HF \quad (3)$$

$$PO_2F + 2H_2O \longrightarrow H_3PO_4 + HF \quad (4)$$

Then, in the lithium-ion rechargeable battery 1 of the present embodiment, as represented by the following reaction formula, the hydrogen fluoride 54 generated in the electrolytic solution 41 reacts with the lithium acetate 53 in the positive electrode mixture 51 to produce acetic acid 55 and lithium fluoride 56.

$$CH_3COOLi + HF \longrightarrow CH_3COOH + LiF \quad (5)$$

The acetic acid 55 is an organic acid 57 having an acid dissociation constant (pKa) of 3.15 or higher and being a relatively weak acid with respect to the hydrogen fluoride 54. Accordingly, in the lithium-ion rechargeable battery 1 of the present embodiment, the weak acidic dissociation reaction between the lithium acetate 53, which functions as the lithium salt 58, and the hydrogen fluoride 54 proceeds as described above, so that the hydrogen fluoride 54 in the electrolytic solution 41 is consumed.

More specifically, in the lithium-ion rechargeable battery 1 of the present embodiment, the lithium acetate 53 in the positive electrode mixture 51 is substantially uniformly present as fine particles around the positive electrode active material 50. For example, the concentration of the lithium acetate 53 contained in the positive electrode mixture 51 may be 10 ppm to 5000 pp. In another example, the concentration of the lithium acetate 53 may be between 500 ppm and 3000 ppm. In this case, the ranges represented by two numbers with the word "between" each refer to a range in which those two numbers are the lower limit value and the upper limited value, respectively (the same applies to the description below).

In other words, the lower limit value of the concentration of the lithium acetate 53 contained in the positive electrode mixture 51 can be set to, for example, 10 ppm, or 500 ppm. The upper limit value of the concentration may be, for example, 3000 ppm or 5000 ppm.

Manufacturing Method

Next, a manufacturing method for forming the positive electrode mixture layer 52 containing the above-described lithium acetate 53 will be described.

Figure 5:
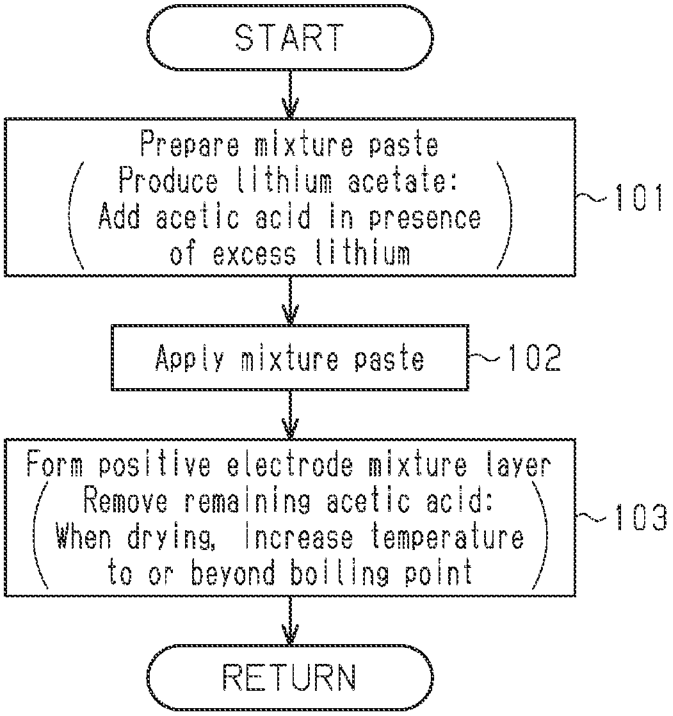
FIG. 5 is a flowchart showing a method for manufacturing a positive electrode mixture layer containing lithium acetate.

As shown in FIG. 5, in the lithium-ion rechargeable battery 1 of the present embodiment, the mixture paste 37P is first prepared (step 101), and then the mixture paste 37P is applied to the base 36P (step 102). Then, the mixture paste 37P applied onto the base 36P is dried to manufacture the electrode sheet 35P for the positive electrode 3, which has the positive electrode mixture layer 52 serving as the positive electrode active material layer 32P (step 103).

In the lithium-ion rechargeable battery 1 of the present embodiment, when the mixture paste 37P is prepared in step 101, the acetic acid 55 is added to the mixture paste 37P. The added acetic acid 55 reacts with excess lithium (not shown) present in the positive electrode active material 50 to produce the lithium acetate 53 in the mixture paste 37P, the lithium acetate 53 reacting with hydrogen fluoride 54 generated in the electrolytic solution 41.

Specifically, the excess lithium in the positive electrode active material 50 is present in a state of lithium hydroxide (LiOH). In the lithium-ion rechargeable battery 1 of the present embodiment, the lithium acetate 53 is produced in the mixture paste 37P through the neutralization reaction between lithium hydroxide and the acetic acid 55, which will be discussed below.

$$LiOH + CH_3COOH \longrightarrow CH_3COOLi + H_2O \quad (6)$$

Specifically, in the lithium-ion rechargeable battery 1 of the present embodiment, when the acetic acid 55 is added to the mixture paste 37P, the excess lithium is adjusted to be present in the positive electrode active material 50 in a concentration range, for example, from 0.03 wt % to 0.5 wt % with respect to the positive electrode active material 50. At this time, the amount of acetic acid 55 added to the mixture paste 37P is adjusted to, for example, 0.1 equivalents to 3 equivalents with respect to the positive electrode active material 50. The term “equivalent” refers to “molar equivalent.”

In other words, when the acetic acid 55 is added to the mixture paste 37P, the amount of excess lithium present in the positive electrode active material 50 is adjusted to be in a range of 0.03 wt % to 0.5 wt % with respect to the positive electrode active material 50. The amount of the added acetic acid 55 is adjusted to be in a range of 0.1 equivalents to 3 equivalents.

Further, in the lithium-ion rechargeable battery 1 of the present embodiment, the temperature of the mixture paste 37P applied to the base 36P is increased to the boiling point of the acetic acid 55 or higher, that is, 118° C. or higher, in the drying step 103. Thus, in the lithium-ion rechargeable battery 1 of the present embodiment, the acetic acid 55 remaining in the mixture paste 37P is removed after the reaction with the excess lithium in step 101.

Operation of the present embodiment will now be described.

In the lithium-ion rechargeable battery 1 of the present embodiment, when the hydrogen fluoride 54 is generated in the electrolytic solution 41, the hydrogen fluoride 54 reacts with the lithium acetate 53 contained in the positive electrode mixture 51. Accordingly, the hydrogen fluoride 54 in the electrolytic solution 41 is consumed.

The present embodiment has the following advantages.

(1) As described above, according to the present embodiment, the hydrogen fluoride 54 generated in the electrolytic solution 41 is consumed by the weak acidic dissociation reaction of the lithium acetate 53 contained in the positive electrode mixture 51. As a result, denaturation of the positive electrode active material 50 due to attack by the hydrogen fluoride 54 is suppressed, and excellent battery performance is ensured.

(2) Particularly, the use of the lithium acetate 53 as the lithium salt 58 in the positive electrode mixture 51 that reacts with the hydrogen fluoride 54 generated in the electrolytic solution 41, the lithium acetate 53 does not inhibit the battery reaction. This ensures superior battery performance.

(3) When the lithium-ion rechargeable battery 1 is in an overheated state, for example, when a short circuit occurs in the electrode body 10, the acetic acid 55, which is a product of the weak acidic dissociation reaction, is vaporized to form bubbles, and the bubbles envelop the positive electrode active material 50. This inhibits the charge transfer to the positive electrode active material 50, thereby increasing the electrical resistance. The current is thus interrupted, so that a further temperature increase is prevented. As a result, a high level of safety is ensured.

(4) In particular, the boiling point of the acetic acid 55 is usually lower than the melting point of the separators 5. Therefore, the current is interrupted to prevent a further temperature increase before the separators 5 melt and the positive electrode 3 and the negative electrode 4 come into surface contact with each other. This ensures a higher level of safety.

(5) When the mixture paste 37P is produced, the acetic acid 55 is added to the mixture paste 37P. The added acetic acid 55 reacts with excess lithium in the positive electrode active material 50 to produce the lithium acetate 53 in the mixture paste 37P.

With the above-described configuration, it is possible to easily manufacture the lithium-ion rechargeable battery 1, in which the lithium salt 58 is contained in the positive electrode mixture 51, by utilizing the neutralization reaction between the excess lithium in the positive electrode active material 50 and the acetic acid 55 added to the mixture paste 37P.

In addition, the lithium acetate 53 in the positive electrode mixture 51 is substantially uniformly present as fine particles around the positive electrode active material 50. Thus, the lithium acetate 53 is efficiently reacted with the hydrogen fluoride 54, which attacks the positive electrode active material 50.

Further, the acetic acid 55, which is a product of the weak acidic dissociation reaction, is present in the vicinity of the positive electrode active material 50. Thus, the vaporized acetic acid 55 rapidly envelops the positive electrode active material 50 when overheated. This suppresses a further temperature increase in a more favorable manner.

In addition, the fine particulate lithium acetate 53 present around the positive electrode active material 50 improves the sliding property within the positive electrode active material 50 contained in the positive electrode mixture 51. Thus, when the electrode body 10 is formed, the pressure acting on the positive electrode active material 50 is reduced.

(6) When the mixture paste 37P applied to the base 36P is dried, the mixture paste 37P is heated to a temperature higher than or equal to the boiling point of the added acetic acid 55. Accordingly, this simple configuration readily removes the acetic acid 55 remaining in the mixture paste 37P after the reaction of the positive electrode active material 50 with the excess lithium.

The above-described embodiment may be modified as follows. The above-described embodiment and the following modifications can be combined as long as the combined modifications remain technically consistent with each other.

The present disclosure may be applied to a configuration in which the electrolytic solution 41 contains a fluorine compound as an additive. Examples of the fluorine-containing additive used in the electrolytic solution 41 of the lithium-ion rechargeable battery 1 include fluorosulfonic acid (FSO) and fluoroethylene carbonate (FEC). The fluorosulfonic acid is added to the electrolytic solution 41 in the form of, for example, a lithium salt, that is, lithium fluorosulfonate. In addition, the present disclosure may employ, as an additive, a fluorine compound in which the number of fluorine atoms (F) contained in one molecule is two, in addition to the fluorine compound in which the number of fluorine atoms (F) contained in one molecule is one. Examples of the additive having two fluorine atoms include difluoroethylene carbonate (DFEC) and lithium bis(fluorosulfonyl)imide (LFSI).

The use of such a fluorine-containing additive improves battery performance. However, the hydrogen fluoride 54 is easily generated in the electrolytic solution 41. In this case, the process in which the hydrogen fluoride 54 is generated in the electrolytic solution 41 is represented by, for example, the following reaction formulas.

$$C_3H_3FO_3 + H_2O \longrightarrow C_3H_4O_4 + HF \quad (7)$$

$$FSO_3H + H_2O \longrightarrow H_2SO_4 + HF \quad (8)$$

In this regard, the lithium acetate 53 is contained in the positive electrode mixture 51 of the lithium-ion rechargeable battery 1 using such a fluorine-containing additive as in the above-described embodiment. Then, the lithium acetate 53 is reacted with the hydrogen fluoride 54 generated in the electrolytic solution 41 to effectively suppress denaturation of the positive electrode active material 50 due to the attack of the hydrogen fluoride 54. Accordingly, excellent battery performance is ensured.

Specifically, in the case of using a fluorine compound such as FSO or FEC, in which the number of fluoride atoms contained in one molecule is one, these fluorine-containing additives may be added to the electrolytic solution 41 in a range of 0.01 mol/L to 0.3 mol/L, for example. In this case, for example, the concentration of the lithium acetate 53 contained in the positive electrode mixture 51 may be higher than or equal to 80 ppm. In another example, the concentration of the lithium acetate 53 may be between 100 ppm and 3000 ppm.

In other words, the lower limit value of the concentration of the lithium acetate 53 contained in the positive electrode mixture 51 can be set to, for example, 80 ppm or 100 ppm, in this case. The upper limit value of the concentration may be, for example, 3000 ppm. Further, the lower limit value of the concentration may be, for example, 500 ppm as in a case in which no fluorine-containing additive is contained. The upper limit value of the concentration may be increased to, for example, 5000 ppm, and the lower limit value may be reduced to, for example, 10 ppm, by using the values in the case in which the electrolytic solution 41 contains no fluorine compound as an additive.

When a fluorine compound such as DFEC or LFSI, in which the number of fluorine atoms contained in one molecule is two, is used, the concentration of the lithium acetate 53 contained in the positive electrode mixture 51 may be adjusted appropriately. Accordingly, the lithium acetate 53 is allowed to be efficiently reacted with the hydrogen fluoride 54 generated in the electrolytic solution 41 without inhibiting the battery reaction.

In the above-described embodiment, when the mixture paste 37P is produced, the acetic acid 55 is added to react with the excess lithium in the positive electrode active material 50 to produce the lithium acetate 53 in the mixture paste 37P. However, the present disclosure is not limited thereto. When the mixture paste 37P is produced, the fine particulate lithium acetate 53 may be mixed into the mixture paste 37P. The method of causing the acetic acid 55 added to the mixture paste 37P to react with the excess lithium in the positive electrode active material 50 and the method of mixing the particulate lithium acetate 53 into the mixture paste 37P may be used in combination.

In the above-described embodiments, the lithium acetate 53 is contained in the positive electrode mixture 51. However, the present disclosure is not limited thereto. The lithium salt 58 contained in the positive electrode mixture 51 does not necessarily need to be the lithium acetate 53 as long as the weak acidic dissociation reaction with the hydrogen fluoride 54 generated in the electrolytic solution 41 proceeds. That is, it suffices if the lithium salt 58 contained in the positive electrode mixture 51 reacts with the hydrogen fluoride 54 generated in the electrolytic solution 41 to produce the organic acid 57 that is a weak acid relative to the hydrogen fluoride 54 and has an acid dissociation constant of 3.15 or higher.

In addition, the boiling point of the organic acid 57 produced by the weak acidic dissociation reaction between the hydrogen fluoride 54 generated in the electrolytic solution 41 and the lithium salt 58 contained in the positive electrode mixture 51 is preferably lower than or equal to the melting point of the separators 5. By employing this configuration, the organic acid 57 is vaporized and forms bubbles when overheated, and envelops the positive electrode active material 50 before the separators 5 melt. As a result, generation of a large current due to surface contact between the positive electrode 3 and the negative electrode 4 is prevented. This ensures a high level of safety.

In the above-described embodiment, the positive and negative electrode sheets 35P, 35N stacked together with the separators 5 interposed therebetween are wound to form the electrode body 10. However, the present disclosure is not limited thereto, and the electrode body 10 may be a laminated electrode body 10 having multiple groups of electrode plates.

The shapes of the positive terminal 38P and the negative terminal 38N are not limited to the shapes shown in FIG. 1, but may be changed.

EXAMPLES

Hereinafter, examples and the like for concretely illustrating the configuration and advantages of the present disclosure will be described. The present disclosure is limited to Examples.

Cycles", "Resistance Increase Rate after 1000 Cycles", and "Nail Penetration Test Result" indicates a battery performance result of the lithium-ion rechargeable battery 1.

On Table 1, numerical values in the column titled "Initial Resistance" are preferably closer to 100%. The numerical values in the column titled "Capacity Retention Rate after

TABLE 1

| | Acid | | | | In | | | | | Capacity | Resistence | |
|---|---|---|---|---|---|---|---|---|---|---|---|---|
| | Acid Species — | pKa — | Boiling Point ° C. | Addition Amount Equivalent (Verses LiOH) | Active Material LiOH Amount % (wt %) | Mixture Salt Concent-ration ppm | Drying Temper-ature ° C. | Electro-lytic Solation Additive — | Initial Resistance Ratio) — | Rate after 1000 Cycles % | Increase Rate After 1000 Crates % | Nell Prostration Test Result — |
| Compar-ative Example 1 | — | — | — | — | 0.13% | 0 | 180° C. | None | 100% | 85% | 10% | Ignition<br>Ignition |
| Compar-ative Example 2 | Acetic Acid | 4.76 | 118° C. | 2 | <0.01% | <10 | 180° C. | None | 101% | 85% | 12% | |
| Example 1 | Acetic Acid | 4.76 | 118° C. | 0.1 | 0.03% | 27 | 180° C. | None | 100% | 87% | 9% | No Ignition |
| Example 2 | Acetic Acid | 4.76 | 118° C. | 0.5 | 0.13% | 585 | 180° C. | None | 101% | 91% | 6% | No Ignition |
| Example 3 | Acetic Acid | 4.76 | 118° C. | 0.5 | 0.32% | 1440 | 180° C. | None | 101% | 90% | 6% | No Ignition |
| Example 4 | Acetic Acid | 4.76 | 118° C. | 1 | 0.32% | 2880 | 180° C. | None | 101% | 90% | 7% | No Ignition |
| Example 5 | Acetic Acid | 4.76 | 118° C. | 3 | 0.50% | 4500 | 180° C. | None | 105% | 91% | 6% | No Ignition |
| Compara-tive Example 3 | Succinic Acid | 4.2 | ≥190° C. | 1 | 0.13% | 1134 | 180° C. | None | 100% | 90% | 7% | Ignition |
| Compar-ative Example 4 | Saccinic Acid | 4.2 | ≥190° C. | 3 | 0.50% | 13500 | 180° C. | None | 120% | 91% | 6% | Ignition |
| Compar-ative Example 5 | Cratic Acid | 1.27 | 190° C. (Decom-pose) | 1 | 0.13% | 113 | 180° C. | None | 102% | 83% | 15% | Ignition |
| Compar-ative Example 6 | — | — | — | — | 0.13% | 0 | 180° C. | FEC | 100% | 91% | 5% | Ignition |
| Example 6 | Acetic Acid | 4.78 | 118° C. | 1 | 0.13% | 1134 | 180° C. | FEC | 101% | 96% | 3% | No Ignition |
| Exemple 7 | Acetic Acid | 4.76 | 118° C. | 0.3 | 0.03% | 81 | 180° C. | FEC | 101% | 92% | 5% | No Ignition |
| Compar-ative Example 7 | — | — | — | — | 0.13% | 0 | 180° C. | FS03L I | 100% | 90% | 5% | Ignition |
| Example 8 | Acetic Acid | 4.76 | 118° C. | 1 | 0.13% | 1170 | 180° C. | FS03L I | 101% | 95% | 3% | No Ignition |
| Example 9 | Acetic Acte | 4.76 | 118° C. | 0.3 | 0.03% | 81 | 180° C. | FS03L I | 101% | 91% | 5% | No Ignition |

On Table 1, the column titled "Acid" shows the types, physical properties, and addition amounts of the organic acid 57 added to the mixture paste 37P when the mixture paste 37P was prepared. The column titled "In Active Material" shows the amount of excess lithium (amount of LiOH) in the positive electrode active material 50, and the column titled "Mixture" shows the concentration of the lithium salt 58 contained in the positive electrode mixture 51. The column titled "Drying Temperature" shows the temperature at which the mixture paste 37P applied to the base 36P was dried. The drying temperature was uniformly 180° C. in each Example and each Comparative Example on Table 1.

In addition, the column titled "Electrolytic Solution Additive" on Table 1 shows the presence or absence of a fluorine-containing additive added to the electrolytic solution 41 and the type of the fluorine-containing additive, which is a fluorine compound. Each of the columns titled "Initial Resistance", "Capacity Retention Rate after 1000 Cycles" are also preferably closer to 100%. However, it is preferable that the numerical value in the column titled "Initial Resistance" be smaller and the numerical value in the column titled "Capacity Retention Rate after 1000 Cycles" be larger, due to their nature. It is preferable that the numerical values in the column titled "Resistance Increase Rate after 1000 Cycles" be smaller.

The nail penetration test is a non-normal mode test in which a metal nail is stuck into a cell, which serves as a basic unit of the lithium-ion rechargeable battery 1, to forcibly short-circuit the positive electrode 3 and the negative electrode 4. The nail penetration test is a test for artificially creating a state that cannot occur normally, such as a case in which the lithium-ion rechargeable battery 1 is broken due to application of a strong impact or the like, for example. In this test, when a large current flows due to the occurrence of a short circuit, the lithium-ion rechargeable battery 1 becomes overheated. The column titled "Nail Penetration Test Result" indicates whether or not ignition occurred in the lithium-ion rechargeable battery 1, that is, the level of the safety margin.

<Salt Concentration in Positive Electrode Mixture>

First, with reference to Comparative Example 1, Comparative Example 2, and Example 1 to Example 5 on Table 1, the relationship between the concentration of the lithium salt 58 contained in the positive electrode mixture 51, that is, the salt concentration in the positive electrode mixture 51 and battery performance will be examined.

Comparative Example 1, Comparative Example 2, and Example 1 to Example 5 were different from each other in the salt concentration in the positive electrode mixture 51. Specifically, in Comparative Example 1, the positive electrode mixture 51 did not contain the lithium salt 58. The values of the salt concentration in the positive electrode mixture 51 in Comparative Example 2 and Example 1 to Example 5 increase in the order of arrangement on Table 1. In Comparative Example 2 and Example 1 to Example 5, the acid species of the organic acid 57 produced by the reaction of the lithium salt 58 contained in the positive electrode mixture 51 with the hydrogen fluoride 54 generated in the electrolytic solution 41 was acetic acid 55.

That is, in each of Comparative Example 2 and Example 1 to Example 5, the acetic acid 55 was added as the organic acid 57 to be reacted with excess lithium (LiOH) in the positive electrode active material 50 when the mixture paste 37P was prepared. At this time, as shown in the column titled "LiOH Amount and Addition Amount" on Table 1, the amount of excess lithium present in the positive electrode active material 50 and the addition amount of the acetic acid 55 were adjusted for each of Comparative Example 2 and Example 1 to Example 5. Thus, the concentration of the lithium acetate 53, which is lithium salt 58 contained in the positive electrode mixture 51, i.e., the salt concentration was different among the Comparative Example 2 and Example 1 to Example 5.

Specifically, in Example 1 to Example 5, the value (ppm) of the salt concentration was 27, 585, 1440, 2880, and 4500 in the order of arrangement on Table 1, respectively. The salt concentration in Comparative Example 2 was less than 10.

Under such experimental conditions, the initial resistance, which is an evaluation index of battery performance, of Comparative Example 1, in which the salt concentration was 0, was defined as 100%. The values of the initial resistances of Comparative Example 2 and Example 1 to Example 4 were 100 to 101%, which were substantially the same as that of Comparative Example 1. In Example 5, in which the value of the salt concentration was the highest, the initial resistance was observed to increase up to 105%.

The value of the capacity retention rate after 1000 cycles was 87% in Example 1, while those in Comparative Example 1 and Comparative Example 2 were 85%. This demonstrates a performance improvement of Example 1. The value of the capacity retention rate after 1000 cycles was 90% to 91% in Example 2 to Example 5, which had relatively high salt concentrations. This demonstrates a further performance improvement of Example 2 to Example 5.

The value of the resistance increase rate after 1000 cycles was 9% in Example 1, while those in Comparative Example 1 and Comparative Example 2 were 10% and 12%, respectively. This demonstrates a performance improvement of Example 1. The value of the resistance increase rate after 1000 cycles was 6% to 7% in Example 2 to Example 5, which had relatively high salt concentrations. This demonstrates a further performance improvement of Example 2 to Example 5. Regarding the nail penetration test result, ignition was observed in Comparative Example 1 and Comparative Example 2, whereas no ignition was observed in Example 1 to Example 5.

The above examination demonstrates that battery performance was improved by containing the lithium salt 58, which reacted with the hydrogen fluoride 54 generated in the electrolytic solution 41, in the positive electrode mixture 51.

However, in Comparative Example 2, in which the salt concentration in the positive electrode mixture 51 was the lowest, no remarkable performance improvement was achieved even by inclusion of the lithium salt 58. This suggests that the lower limit value of the preferable salt concentration is 10 ppm, which is higher than that in Comparative Example 2. Furthermore, an increase in the initial resistance was observed in Example 5, in which the salt concentration was the highest. Accordingly, it is estimated that the upper limit value of the preferable salt concentration is a value that does not significantly exceed 4500 ppm, which is the value of Comparative Example 2. The upper limit value is estimated to be, for example, about 5000 ppm. In addition, since a more significant performance improvement was observed in Example 2 to Example 4, it is estimated that a more preferable salt concentration is in the range of 500 ppm to 3000 ppm, which includes the values of Example 2 to Example 4.

In addition, in Example 1, in a state in which excess lithium (LiOH) of 0.03 wt % with respect to the positive electrode active material 50 was present in the positive electrode active material 50, 0.1 equivalents of the acetic acid 55 were added to the positive electrode active material 50 to obtain a salt concentration of 27 ppm. Similarly, in Example 2, 0.5 equivalents of the acetic acid 55 were added in the presence of 0.13 wt % of excess lithium to obtain a salt concentration of 585 ppm. Also, in Example 3, 0.5 equivalents of the acetic acid 55 were added in the presence of 0.32 wt % of excess lithium to obtain a salt concentration of 1440 ppm.

Further, in Example 4, 1 equivalent of the acetic acid 55 was added in the presence of 0.32 wt % of excess lithium to obtain a salt concentration of 2880 ppm. In Example 5, 3 equivalents of the acetic acid 55 was added in the presence of 0.50 wt % of excess lithium to obtain a salt concentration of 4500 ppm.

Although, in Comparative Example 2, 2 equivalents of the acetic acid 55 was added to the positive electrode active material 50, the amount of excess lithium in the positive electrode active material 50 was less than 0.01 wt %. Due to the excessively small amount of excess lithium, the salt concentration of the lithium acetate 53 obtained by the neutralization reaction with the acetic acid 55 was as low as less than 10 ppm.

As seen from the above, in the step of adding the organic acid 57 to the mixture paste 37P to produce the lithium salt 58, the preferable amount of excess lithium is estimated to be greater than or equal to 0.03 wt % or 0.5 wt % with respect to the positive electrode active material 50. At this time, it is estimated that the preferable addition amount of the organic acid 57 is in a range of 0.1 to 3 equivalents with respect to the positive electrode active material 50.

<Acid Species of Organic Acid>

Next, with reference to Comparative Example 3 to Comparative Example 5 on Table 1, the relationship between battery performance and the types of the organic acid 57 to be reacted with the excess lithium in the positive electrode active material 50 when preparing the mixture paste 37P will be examined.

"Acid Species" refers to the acid species of the organic acid 57, which was part of the lithium salt 58 present in the positive electrode mixture 51 produced by the above-described neutralization reaction. Also, "Acid Species" refers to the acid species of the organic acid 57 produced in the positive electrode mixture 51 when the lithium salt 58 contained in the positive electrode mixture 51 reacted with the hydrogen fluoride 54 generated in the electrolytic solution 41.

Specifically, the acid species in Comparative Example 3 and Comparative Example 4 was succinic acid, and the acid species in Comparative Example 5 was oxalic acid. Comparative Example 3 and Comparative Example 4 were different from each other in the salt concentration in the positive electrode mixture 51.

Specifically, in Comparative Example 3, 1 equivalent of succinic acid was added in the presence of 0.13 wt % of excess lithium to obtain a salt concentration of 1134 ppm. Also, in Comparative Example 4, 3 equivalents of succinic acid was added in the presence of 0.50 wt % of excess lithium to obtain a salt concentration of 13500 ppm. In Comparative Example 4, 1 equivalent of the oxalic acid was added in the presence of 0.13 wt % of excess lithium to obtain a salt concentration of 1134 ppm.

The acid dissociation constant (pKa) of succinic acid was 4.2, and the acid dissociation constant of oxalic acid was 1.27. The boiling point of succinic acid is 190° C. or higher, and oxalic acid decomposes at 190° C.

Under such experimental conditions, the initial resistance, which is an evaluation index of battery performance, of Comparative Example 3 was defined as 100%. The value of the initial resistance of Comparative Example 4 was significantly increased to 120%. The initial resistance of Comparative Example 5 was 102%.

The capacity retention rate after 1000 cycles was 90% in Comparative Example 3, 91% in Comparative Example 4, and 83% in Comparative Example 5. The resistance increase rate after 1000 cycles was 7% in Comparative Example 3, 6% in Comparative Example 4, and 15% in Comparative Example 5. Regarding the nail penetration test result, ignition was observed in each of Comparative Example 3 to Comparative Example 5.

As described above, although the effect was more limited than that in the case in which the acid species was the acetic acid 55, the improvement of the performance of the lithium-ion rechargeable battery 1 by containing the lithium salt 58 in the positive electrode mixture 51 was observed in Comparative Example 3 and Comparative Example 4, in which the acid species was succinic acid. However, in Comparative Example 5, in which the acid species was oxalic acid, the improvement of the performance was not observed. This suggests that the lithium salt 58 produced in the positive electrode mixture 51 through the neutralization reaction between the oxalic acid added to the mixture paste 37P and the excess lithium in the positive electrode active material 50, i.e., lithium oxalate did not react with the hydrogen fluoride 54 generated in the electrolytic solution 41.

That is, in Comparative Example 3 and Comparative Example 4, in which succinic acid having an acid dissociation constant of 3.15 or higher was the acid species, a weak acidic dissociation reaction proceeded between the lithium salt 58 produced in the positive electrode mixture 51 through the neutralization reaction, that is, lithium succinate and the hydrogen fluoride 54 generated in the electrolytic solution 41. As a result, the hydrogen fluoride 54 generated in the electrolytic solution 41 was consumed, whereby the performance of the lithium-ion rechargeable battery 1 was improved.

In contrast, in Comparative Example 5, in which oxalic acid having an acid dissociation constant of 3.15 or less was the acid species, a weak acidic dissociation reaction proceeded between the lithium oxalate produced in the positive electrode mixture 51 through the neutralization reaction and the hydrogen fluoride 54 generated in the electrolytic solution 41. It is thus estimated that the hydrogen fluoride 54 generated in the electrolytic solution 41 would remain as it is, so that the performance of the lithium-ion rechargeable battery 1 gradually decreases.

Similarly, in Comparative Example 3 and Comparative Example 4, in which succinic acid was the acid species, the value of the initial resistance deteriorated in Comparative Example 4, in which the salt concentration was relatively high. Accordingly, it is considered that the lithium salt 58 in the positive electrode mixture 51 inhibits the battery reaction when the salt concentration is excessively high.

That is, the salt concentration of Comparative Example 3 was within the range of 10 ppm to 5000 ppm, which is a preferable range in the case in which the acid species is acetic acid 55, whereas the value of Comparative Example 4 significantly exceeded this range. Likewise, the salt concentration of Comparative Example 3 was within the range of 500 ppm to 3000 ppm, which is a more preferable range in the case in which the acid species is acetic acid 55. Therefore, even when an acid species other than acetic acid 55 is used, the salt concentration thereof is preferably in the range of 10 ppm to 5000 ppm, and more preferably in the range of 500 ppm to 3000 ppm.

Further, it is estimated that the reason why ignition was observed in the nail penetration test of Comparative Example 3 and Comparative Example 4 was that the boiling point of succinic acid is higher than that of acetic acid 55. That is, in a case in which the acid species is succinic acid, the succinic acid, which functions as the organic acid 57 in the electrolytic solution 41 produced through the weak acidic dissociation reaction with the hydrogen fluoride 54, is not easily vaporized. Thus, it is considered that the generated bubbles did not readily enveloped the positive electrode active material 50, and thus the generation of a large current that led to ignition was not suppressed.

<Fluorine-Containing Additive>

Next, with reference to Comparative Example 6, Comparative Example 7, and Example 6 to Example 9 on Table 1, a case in which the electrolytic solution 41 contained a fluorine-based additive will be examined.

In Comparative Example 6, Example 6, and Example 7, fluoroethylene carbonate (FEC) was contained, as an additive, in the electrolytic solution 41. Also, in Comparative Example 7, Example 8, and Example 9, fluorosulfonic acid (FSO) was included, as an additive, in the electrolytic solution 41. In these Comparative Examples and Examples, FSO in a state of a lithium salt, that is, as lithium fluorosulfonate, was added to the electrolytic solution 41. Both of these two additives were fluorine compounds in which the number of fluorine atoms contained in one molecule was one. Further, in Comparative Example 6 and Comparative Example 7, the positive electrode mixture 51 did not contain lithium salt 58. Example 6 and Example 7 were different from each other in salt concentration in the positive electrode mixture 51. Also, Example 8 and Example 9 were different from each other in salt concentration in the positive electrode mixture 51.

Specifically, in Example 6, 1 equivalent of the acetic acid 55 was added in the presence of 0.13 wt % of excess lithium to obtain a salt concentration of 1134 ppm. In Example 7, 0.3 equivalents of the acetic acid 55 was added in the presence of 0.03 wt % of excess lithium to obtain a salt concentration of 81 ppm. In Example 8, 1 equivalent of the acetic acid 55 was added in the presence of 0.13 wt % of excess lithium to obtain a salt concentration of 1170 ppm. In Example 9, 0.3 equivalents of the acetic acid 55 was added in the presence of 0.03 wt % of excess lithium to obtain a salt concentration of 81 ppm.

Under such experimental conditions, the initial resistance, which is an evaluation index of battery performance, of Comparative Example 6 defined as 100% when FEC was contained as the additive in the electrolytic solution 41. The values of the initial resistances of Comparative Example 6 and Comparative Example 7 were both 101%. Similarly, when FSO was contained as an additive in the electrolytic solution 41, the initial resistance of Comparative Example 7 was defined as 100%. Those of Example 8 and Example 9 were both 101%.

The resistance increase rate after 1000 cycles was 91% in Comparative Example 6, 96% in Example 6, and 92% in Example 7. Further, the resistance increase rate after 1000 cycles was 90% in Comparative Example 7, 95% in Example 8, and 91% in Example 9. Regarding the nail penetration test result, ignition was observed in Comparative Example 6 and Comparative Example 7, in which the lithium salt 58 was not contained in the positive electrode mixture 51, whereas no ignition was observed in Example 6 to Example 9, in which the lithium salt 58 was contained in the positive electrode mixture 51.

As described above, it was confirmed that the performance of the lithium-ion rechargeable battery 1 was improved by containing the lithium salt 58 in the positive electrode mixture 51 even in a case in which the electrolytic solution 41 contained a fluorine-containing additive.

Regarding the salt concentration in the positive electrode mixture 51, when the electrolytic solution 41 contained FEC as an additive, a greater performance improvement was achieved in Example 6, which had a higher salt concentration, than in Example 7, which had a lower salt concentration. Similarly, when the electrolytic solution 41 contained FSO as an additive, a greater performance improvement was achieved in Example 8, which had a higher salt concentration, than in Example 9, which had a lower salt concentration.

Further, since the values of the salt concentration of Example 7 and Example 9, which had lower salt concentrations were both 81 ppm, it is estimated that the preferable salt concentration range in the case in which the electrolytic solution 41 contains a fluorine-containing additive is, for example, 80 ppm or higher. A more preferable range of the salt concentration is estimated to be, for example, 100 ppm or higher.

The upper limit value of the preferable salt concentration range may be the upper limit value in the case in which a fluorine-containing additive is not contained in the electrolytic solution 41. Therefore, also in the case in which the electrolytic solution 41 contains a fluorine-containing additive, the preferable range of the salt concentration is estimated to be, for example, less than or equal to 5000 ppm. Further, a more preferable range of the salt concentration is estimated to be, for example, less than or equal to 3000 ppm. Also, regarding the lower limit value of the preferable salt concentration range, the value in the case in which the electrolytic solution 41 contains no fluorine-containing additive can be used. In this case, it is estimated that the further preferable range is, for example, 500 ppm.

Technical concepts obtained from the above-described embodiment and the modifications will now be described.

(a) A lithium-ion rechargeable battery in which the additive is lithium fluorosulfonate.

(b) A lithium-ion rechargeable battery in which the additive is fluoroethylene carbonate.

(c) A method for manufacturing a lithium-ion rechargeable battery in which the excess lithium is lithium hydroxide.

(d) A method for manufacturing a lithium-ion rechargeable battery, the method comprising removing the organic acid remaining in the mixture paste by increasing the temperature to a boiling point of the organic acid or higher when drying the mixture paste applied on the base. Accordingly, this simple configuration readily removes the organic acid remaining in the mixture paste after the reaction of the positive electrode active material with the excess lithium.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A lithium-ion rechargeable battery, comprising:
a positive electrode;
a negative electrode;
separators; and
a non-aqueous electrolytic solution,
wherein:
the positive electrode includes a positive electrode collector and a positive electrode mixture layer that is arranged on the positive electrode collector,
the positive electrode mixture layer includes a positive electrode active material and a lithium salt,
the lithium salt reacts with hydrogen fluoride generated in an electrolytic solution to produce an organic acid that is a weak acid relative to the hydrogen fluoride, an acid dissociation constant of the organic acid being 3.15 or higher, and
fine particles of the lithium salt are dispersed on a surface of the positive electrode active material and are spaced apart from each other.

2. The lithium-ion rechargeable battery according to claim 1, wherein a concentration of the lithium salt included in the positive electrode mixture is in a range of 10 ppm to 5000 ppm.

3. The lithium-ion rechargeable battery according to claim 1, wherein the electrolytic solution includes a fluorine compound as an additive.

4. The lithium-ion rechargeable battery according to claim 3, wherein
a number of fluorine atoms included in one molecule of the fluorine compound additive is one, the fluorine compound additive is added to the electrolytic solution in a range of 0.01 mol/L to 0.3 mol/L, and a concentration of the lithium salt included in the positive electrode mixture is in a range of 80 ppm to 3000 ppm.

5. The lithium-ion rechargeable battery according to claim 4, wherein the concentration of the lithium salt is greater than or equal to 100 ppm.

6. The lithium-ion rechargeable battery according to claim 1, wherein a concentration of the lithium salt included in the positive electrode mixture is in a range of 500 ppm to 3000 ppm.

7. The lithium-ion rechargeable battery according to claim 1, wherein a boiling point of the organic acid is lower than or equal to a melting point of a separator.

8. The lithium-ion rechargeable battery according to claim 1, wherein the organic acid includes acetic acid.

* * * * *